US008893102B2

(12) United States Patent
Keynes et al.

(10) Patent No.: US 8,893,102 B2
(45) Date of Patent: Nov. 18, 2014

(54) METHOD AND SYSTEM FOR PERFORMING BACKWARD-DRIVEN PATH-SENSITIVE DATAFLOW ANALYSIS

(75) Inventors: Nathan Robert Albert Keynes, Kuraby (AU); Cristina N. Cifuentes, Brisbane (AU); Lian Li, Carindale (AU)

(73) Assignee: Oracle International Corporation, Redwood Shores, CA (US)

( * ) Notice: Subject to any disclaimer, the term of this patent is extended or adjusted under 35 U.S.C. 154(b) by 633 days.

(21) Appl. No.: 13/192,349

(22) Filed: Jul. 27, 2011

(65) Prior Publication Data

US 2013/0031531 A1 Jan. 31, 2013

(51) Int. Cl.
*G06F 9/45* (2006.01)

(52) U.S. Cl.
USPC ............................................. 717/157

(58) Field of Classification Search
USPC ............... 717/106, 144, 156, 157; 703/3, 22; 716/5, 103, 106; 707/3
IPC ......... G06F 11/3608,8/433, 9/44589, 17/30625; G06N 5/042, 5/046, 5/003, 5/02
See application file for complete search history.

(56) References Cited

U.S. PATENT DOCUMENTS

| 2004/0230407 | A1* | 11/2004 | Gupta et al. | 703/2 |
| 2005/0166167 | A1* | 7/2005 | Ivancic et al. | 716/5 |
| 2006/0282807 | A1* | 12/2006 | Ivancic et al. | 716/5 |
| 2009/0193401 | A1* | 7/2009 | Balakrishnan et al. | 717/144 |
| 2009/0281999 | A1* | 11/2009 | Sinha | 707/3 |
| 2009/0326907 | A1* | 12/2009 | Gulwani et al. | 703/22 |
| 2010/0305919 | A1* | 12/2010 | Ganai et al. | 703/2 |

OTHER PUBLICATIONS

Harris et al, "Program Analysis via Satisfiability Modulo Path Programs", Jan. 2010, POPL's10, pp. 1-11 <Satisfiability_2010.pdf>.*
Ball, T., Rajamani, S. K., "Automatically Validating Temporal Safety Properties of Interfaces", In Proceedings of the Workshop on Model Checking of Software (SPIN), LNCS 2057, May 2011, 18 pages.
Bodik, R., Anik, S., "Path-Sensitive Value-Flow Analysis", In POPL '98: Proceedings of the 25th ACM SIGPLAN-SIGACT Symposium on Principles of Programming Languages, Jan. 1998, 15 pages.
Das, M., Lerner, S., Seigle, M., "ESP: Path-Sensitive Program Verification in Polynomial Time", In Proceedings of the Conference on Programming Language Design and Implementation (PLDI), ACM Press, Jun. 2002, 12 pages.

(Continued)

*Primary Examiner* — Tuan A Vu
(74) *Attorney, Agent, or Firm* — Osha Liang LLP

(57) ABSTRACT

In general, in one aspect, the invention relates to a method for static analysis. The method includes: obtaining source code; constructing a control flow graph (CFG) corresponding to the source code, by identifying control structures within the source code, creating a set of graph nodes of the CFG, and creating a set of directed graph edges of the CFG connecting the set of graph nodes; assigning a first Boolean flow value to a selected node of the set of graph nodes; backward traversing the CFG from the selected node to a target node; computing, by a computer processor and while backward traversing the CFG, disjoint predicate expressions representing flow values at the set of directed graph edges; computing, based on the disjoint predicate expressions, a resulting disjoint predicate expression; and identifying, based on the resulting disjoint predicate expression, a potential program property in the source code.

14 Claims, 8 Drawing Sheets

(56) References Cited

OTHER PUBLICATIONS

Dor, N., Adams, S., Das, M., Yang, Z., "Software Validation via Scalable Path-Sensitive Value Flow Analysis", In ISSTA '04: Proceedings of the 2004 ACM SIGSOFT International Symposium on Software Testing and Analysis, Jul. 11-14, 2004, 11 pages.

Fischer, J., Jhala, R., Majumdar, R., "Joining Dataflow with Predicates", In ESEC/FSE-13: Proceedings of the 10th European Software Engineering Conference held jointly with 13th ACM SIGSOFT International Symposium on Foundations of Software Engineering Conference, SCM Press, Sep. 5-9, 2005, 10 pages.

Jung, Y., Yi, K., "Practical Memory Leak Detector Based on Parameterized Procedural Summaries", In ISMM '08: Proceedings of the 7th International Symposium on Memory Management, Jun. 7-8, 2008, 10 pages.

Thakur, A., Govindarajan, R., "Comprehensive Path-Sensitive Data-Flow Analysis", In CGO '08: Proceedings of the 6th Annual IEEE/ACM International Symposium on Code Generation and Optimization, Apr. 5-10, 2008, 9 pages.

Xie, Y., Aiken, A., "Context-and Path-Sensitive Memory Leak Detection", In ESEC/FSE-13: Proceedings of the 10th European Software Engineering Conference held jointly with 13th ACM SIGSOFT International Symposium on Foundations of Software Engineering Conference, SCM Press, Sep. 5-9, 2005, 11 pages.

\* cited by examiner

METHOD AND SYSTEM FOR PERFORMING BACKWARD-DRIVEN PATH-SENSITIVE DATAFLOW ANALYSIS

BACKGROUND

Static code analysis (i.e., static analysis) techniques involve analysis of source code without executing the source code. Some static analysis methods require an analysis of the potential execution paths of source code. One method of modeling such paths is to generate a control flow graph (CFG). A CFG represents potential execution paths using directed edges connecting basic blocks of source code. Other modeling techniques involving varying degrees of abstraction are also used by some static analysis algorithms.

By identifying defects and other properties of source code using static analysis tools, software reliability improvements have been made to many phases of the software development lifecycle. Analysis of the impact of software defects, for example, has shown potentially high costs associated with memory leaks, deadlocks, and other hazardous program states. In some cases, small investments in analysis tools earlier in the lifecycle can show dividend gains in the form of lower maintenance costs and prevention of potentially costly redesign later.

SUMMARY

In general, in one aspect, the invention relates to a method for static analysis. The method includes: obtaining source code; constructing a control flow graph (CFG) corresponding to the source code, by identifying control structures within the source code, identifying, based on the control structures, a set of basic blocks of reachable code within the source code, creating a set of graph nodes of the CFG representing the set of basic blocks, and creating, based on the control structures, a set of directed graph edges of the CFG connecting the set of graph nodes; assigning a first Boolean flow value to a selected node of the set of graph nodes; backward traversing the CFG from the selected node to a target node of the CFG; computing, by a computer processor and while backward traversing the CFG, disjoint predicate expressions representing flow values at the set of directed graph edges; computing, by the computer processor and based on the disjoint predicate expressions, a resulting disjoint predicate expression representing a resulting flow value at the target node; and identifying, based on the resulting disjoint predicate expression, a potential program property in the source code.

In general, in one aspect, the invention relates to a system for static analysis. The system includes: a processor and a memory; a model generator residing in the memory, executing on the processor, and having functionality to construct a control flow graph (CFG) corresponding to source code, by: identifying control structures within the source code, identifying, based on the control structures, a set of basic blocks of reachable code within the source code, creating graph nodes of the CFG representing the set of basic blocks, and creating, based on the control structures, a set of directed graph edges of the CFG connecting the graph nodes; and a static analysis tool residing in the memory, executing on the processor, and having functionality to: obtain the source code, assign a first Boolean flow value to a selected node of the graph nodes, backward traverse the CFG from the selected node to a target node of the CFG, compute, while backward traversing the CFG, a set of disjoint predicate expressions representing flow values at the set of directed graph edges, compute, based on the set of disjoint predicate expressions, a resulting disjoint predicate expression representing a resulting flow value at the target node, and identify, based on the resulting disjoint predicate expression, a potential program property in the source code.

In general, in one aspect, the invention relates to a computer-readable storage medium storing instructions for static analysis. The instructions include functionality to: obtain source code; construct a control flow graph (CFG) corresponding to the source code, by: identifying control structures within the source code, identifying, based on the control structures, a set of basic blocks of reachable code within the source code, creating graph nodes of the CFG representing the set of basic blocks, and creating, based on the control structures, a set of directed graph edges of the CFG connecting the graph nodes; assign a first Boolean flow value to a selected node of the graph nodes; backward traverse the CFG from the selected node to a target node of the CFG; compute, while backward traversing the CFG, a set of disjoint predicate expressions representing flow values at the set of directed graph edges; compute, based on the set of disjoint predicate expressions, a resulting disjoint predicate expression representing a resulting flow value at the target node; and identify, based on the resulting disjoint predicate expression, a potential program property in the source code.

Other aspects of the invention will be apparent from the following description and the appended claims.

DETAILED DESCRIPTION

Figure 1:
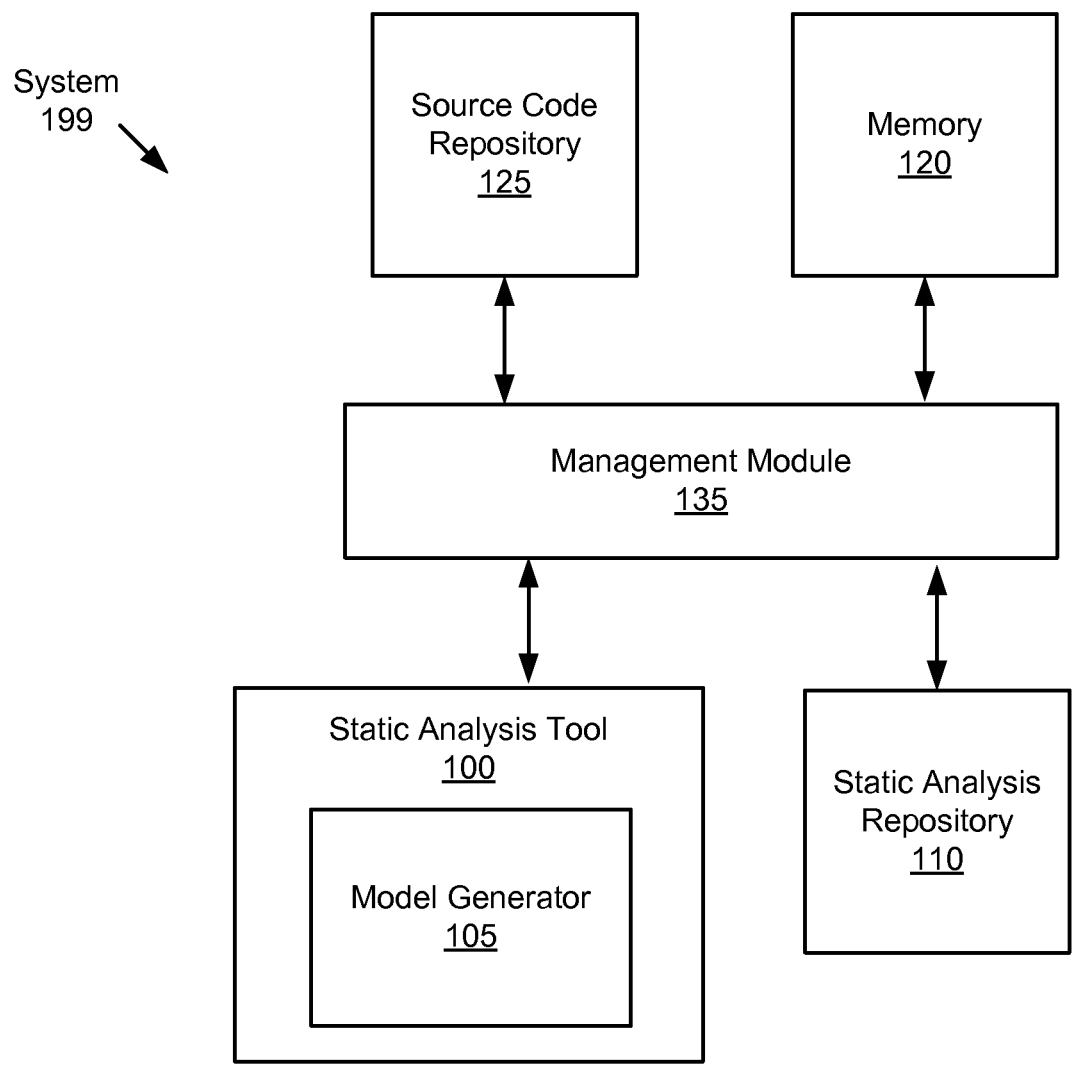
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for performing a path-sensitive static analysis on source code. In general, embodiments of the invention generate a control flow graph (CFG) model of source code, where a backward traversal of the CFG is performed. During the traversal, a set of predicate expressions are computed and propagated through the CFG. A program property may then be identified based on a resulting predicate expression.

A path-sensitive algorithm is one that is able to distinguish between behavior along different paths through a program. A path through a CFG is a list of program blocks from an entry point through an exit point of the CFG.

FIG. 1 shows a system (199) in accordance with one embodiment of the invention. As shown in FIG. 1, the system has multiple components including a static analysis tool (100), a model generator (105), a static analysis repository (110), a memory (120), a source code repository (125), and a management module (135). The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., the Internet), with wired and/or wireless segments. Those skilled in the art will appreciate that there may be more than one of each separate component running on a device, as well as any combination of these components within a given embodiment of the invention.

In one or more embodiments of the invention, the static analysis tool (100) is a software application. The static analysis tool (100) may be an application subroutine, a software module, a library, a job and/or any type of software component in accordance with one or more embodiments of the invention disclosed herein. For example, the static analysis tool (100) may be a software application executable from a command line interface. Alternatively, the static analysis tool (100) may be a hardware device, and/or a component of a hardware device.

In one or more embodiments of the invention, the static analysis tool (100) includes functionality to obtain source code. Source code may be any software code written in one or more programming languages (e.g., C/C++, Java™, Python, Ruby, Personal Home Page (PHP) scripting language, Practical Extraction and Report Language (Perl), Linux®/UNIX® shell script, etc) including compiled languages as well as interpreted languages of any order. Examples of source code may also include assembly code, byte code, and/or instructions outputted by a compiler or other entity. Source code may be a fully functional program and/or a subset of a program such as a function, class, library, statement, instruction, user-defined type, and/or any code segment. Source code may reference one or more outside classes, objects, files, libraries (e.g., a dynamically linked library) and/or application programming interfaces (APIs).

In one or more embodiments of the invention, the static analysis tool (100) is configured to receive the source code from a software development application. The static analysis tool (100) may be operatively connected to one or more software applications including, but not limited to, a concurrent versioning system, a web-based applications development platform, a distributed database of managed source code, and/or any software application or device capable of storing and/or transferring source code.

In one or more embodiments of the invention, the static analysis tool (100) includes a user interface. In one or more embodiments of the invention, the static analysis tool (100) includes functionality to receive the source code from a user of the user interface. The user of the user interface may be an end user of a computer system, a software engineer, a designer, an applications developer, a system administrator, and/or any person or entity communicatively coupled with the static analysis tool (100). In one or more embodiments of the invention, the static analysis tool (100) is configured to import the source code periodically for batch processing of a managed code base.

In one or more embodiments of the invention, the static analysis tool (100) includes functionality to obtain one or more program property definitions. A program property definition may be used to identify one or more program properties within source code. The static analysis tool (100) may obtain the one or more program property definitions from the static analysis repository (110), a software application communicatively connected to the static analysis tool (100), a user of the static analysis tool (100), an author of the source code, and/or any authorized entity in accordance with one or more pre-defined security credentials. Alternatively or additionally, the static analysis tool (100) may be pre-configured and/or designed with the one or more program property definitions and/or security credentials.

A program property may be any type of computer coding impact, data flow, error, vulnerability, inefficiency, or other property related to source code. For example, a program property may cause an unintended state of a computer program and/or a computer system executing the source code. Examples of a program property may include but are not limited to a specified data flow, data flow impact on a program object, an arithmetic defect (e.g., division by zero, arithmetic underflow or overflow, loss of arithmetic precision due to rounding, etc.), a syntax defect (e.g., use of the assignment operator instead of the equality operator, etc.), a multi-threading programming defect (e.g., deadlock, race condition, concurrency error in critical/atomic section, mutual exclusion, etc.), a security vulnerability (i.e., memory safety, user authentication vulnerabilities, etc.), and a compiler optimization inefficiency (i.e., inefficiencies in code analysis/interpretation/generation, etc.).

Continuing with FIG. 1, in one or more embodiments of the invention, the static analysis tool (100) is configured to receive a list of one or more program property definitions from a user and/or authorized entity.

In one or more embodiments of the invention, the static analysis tool (100) includes functionality to perform a program property analysis of the source code. A program property analysis may be a procedure for identifying a program property based on a CFG model of source code. In one or more embodiments of the invention, a program property analysis is associated with an estimated running time, complexity, and/or resource requirement(s). In one or more embodiments of the invention, a program property definition may include a sorted list of program property analyses. The static analysis tool (100) may be configured to sort the list of program property analyses according to one or more sort criteria including estimated running time, complexity, and/or resource requirement(s).

In one or more embodiments of the invention, the static analysis tool (100) includes functionality to parse source code into a set of logical tokens and then analyze the tokens according to syntactical rules of the programming language in which the source code is written. A token may be a smallest element of recognizable syntax in the programming language.

In one or more embodiments of the invention, the static analysis tool (100) and the model generator (105) are configured to use a predefined predicate domain in construction and analysis of a CFG. In one or more embodiments of the invention, a base predicate is defined as an expression X op k where X is any program value, k is a constant, and op is one of the operations =, ≠, <, <=, >=, >, (either signed or unsigned), bit-set-all, bit-set-any, bit-clear-all, or bit-clear-all. The bit operations bit-set-all, bit-set-any, bit-clear-all, and bit-clear-all are used for handling bit-fields, and are defined as per Table 1 below, where & is the standard C bitwise- and operator. A program value may be any value, state, or property derived from source code which can be used as an operand in the aforementioned operations.

TABLE 1

Supported bit-field operators

| Operator | Definition |
| --- | --- |
| X bit-set-all k | (X & k) = k |
| X bit-set-any k | (X & k) ≠ 0 |
| X bit-clear-all k | (X & k) = 0 |
| X bit-clear-all k | (X & k) ≠ k |

In one or more embodiments of the invention, a disjoint predicate expression (i.e., predicate expression) is defined as either TRUE, FALSE, or the disjunction of 1 or more base predicates {X op k ∨ Y op 1 ∨ ... ∨ Z op m} such that no program value (e.g., X, Y, Z) appears more than once.

In one or more embodiments of the invention, in addition to the set of base predicates, the disjoint predicate expression may also contain the placeholder term Unsolvable, which replaces (1) any sub-expressions that would otherwise be unrepresentable with the predicate domain and/or (2) sub-expressions that are excluded from the analysis due to complexity or other reasons. Unsolvable serves primarily as a marker that an expression (typically, a more complex expression) was removed from the predicate. In one or more embodiments of the invention, Unsolvable is treated as an alternative False value.

In one or more embodiments of the invention, the static analysis tool (100) is configured to designate conjunctions between distinct program values as Unsolvable. In one example, the static analysis tool (100) may designate the conjunction "{X=0} ∧ {Y≠0}" as Unsolvable due to the fact that the program values X and Y are distinct.

In one or more embodiments of the invention, the static analysis tool (100) is configured to designate conjunctions or disjunctions involving the same program value that cannot be reduced to a single base predicate as Unsolvable. In one example, the static analysis tool (100) may designate the conjunction "{X<5} ∨ {X>10}" as Unsolvable due to the fact that the base predicates cannot be reduced to a single base predicate using logical rules. In one or more embodiments of the invention, disjoint predicate expressions support the standard logical operations of disjunction and conjunction, which behave per the standard rules for Boolean logic. The operations are commutative, and distribute conjunction over disjunction. After distribution and simplification, any remaining conjunctive sub-expressions may be designated as Unsolvable, as illustrated in Table 2 (below).

TABLE 2

Deduction rules for disjoint predicate expressions

| | | |
| --- | --- | --- |
| P ∨ P ⇒ P (Identity) | TRUE ∨ TRUE | ⇒ TRUE |
| | FALSE ∨ FALSE | ⇒ FALSE |
| | {Unsolvable} ∨ {Unsolvable} | ⇒ {Unsolvable} |
| | {α} ∨ {α} | ⇒ {α} |
| | {α ∨ β} ∨ {α ∨ β} | ⇒ {α ∨ β} |
| P ∨ TRUE ⇒ TRUE | TRUE ∨ FALSE | ⇒ TRUE |
| | TRUE ∨ {Unsolvable} | ⇒ TRUE |
| | {α} ∨ TRUE | ⇒ TRUE |
| P ∨ FALSE ⇒ P | FALSE ∨ {Unsolvable} | ⇒ {Unsolvable} |
| | {α} ∨ FALSE | ⇒ {α} |
| P ∨ ¬P ⇒ TRUE | {α} ∨ {¬α} | ⇒ TRUE |
| | {α} ∨ {¬α ∨ β} | ⇒ TRUE |
| Disjunction | {α} ∨ {Unsolvable} | ⇒ {α ∨ Unsolvable} |
| | {α} ∨ {β} | ⇒ {α ∨ β} |
| | {α} ∨ {α ∨ β} | ⇒ {α ∨ β} |
| | {α ∨ Unsolvable} ∨ {β ∨ Unsolvable} | ⇒ {α ∨ β ∨ Unsolvable} |
| P ∧ P ⇒ P (Identity) | TRUE ∧ TRUE | ⇒ TRUE |
| | FALSE ∧ FALSE | ⇒ FALSE |
| | {Unsolvable} ∧ {Unsolvable} | ⇒ {Unsolvable} |
| | {α} ∧ {α} | ⇒ {α} |
| | {α ∨ β} ∧ {α ∨ β} | ⇒ {α ∨ β} |
| P ∧ FALSE ⇒ FALSE | TRUE ∨ FALSE | ⇒ FALSE |
| | {α} ∧ FALSE | ⇒ FALSE |
| | FALSE ∧ {Unsolvable} | ⇒ FALSE |
| P ∧ TRUE ⇒ P | TRUE ∧ {Unsolvable} | ⇒ {Unsolvable} |
| | {α} ∧ TRUE | ⇒ {α} |
| P ∧ {Unsolvable} ⇒ {Unsolvable} | {α} ∧ {Unsolvable} | ⇒ {Unsolvable} |
| P ∧ ¬P ⇒ FALSE | {α} ∧ {¬α} | ⇒ FALSE |
| {α}∧({α} ∨ P) ⇒ {α} | {α} ∧ {α ∨ β} | ⇒ {α} |
| | {α} ∧ {α ∨ Unsolvable} | ⇒ {α} |
| {α} ∧ {β} ⇒ {Unsolvable} | {α} ∧ {β} | ⇒ {Unsolvable} |
| | {α} ∧ {β ∨ γ} | ⇒ {Unsolvable} |
| | {α ∨ β} ∧ {α ∨ γ} | ⇒ {α ∨ Unsolvable} |
| Merge simplification | ({α}∧{β}) ∨ {¬β} | ⇒ {α ∨ ¬β} |
| | ({α}∧{β}) ∨ ({α}∧{¬β}) | ⇒ {α} |
| | ({α ∨ γ}∧{β}) ∨ ({α}∧{¬β}) | ⇒ {α ∨ Unsolvable} |

In one or more embodiments of the invention, the model generator (105) includes functionality to generate a CFG model of source code. The CFG depicts one or more potential execution paths of the source code and may include one or more graph nodes connected by one or more directed graph edges.

In one or more embodiments of the invention, the model generator (105) includes functionality to identify one or more control structures within the source code. A control structure may be any statement which, when executed, results in a selection of a path among a set of alternative paths. Thus, in one or more embodiments of the invention, a control structure may select between two or more alternative paths based on evaluation of a conditional statement and/or operation. The conditional statement may have a Boolean result, a numerical result, and/or may result in any value or state which is then used by the control structure to determine an execution path.

In one or more embodiments of the invention, the model generator (105) is configured to identify, based on the identified control structures, a set of basic blocks of reachable code within the source code. Each basic block may include one or more statements and/or instructions that are necessarily executed together (i.e., not separated by any control structures). Thus, in one or more embodiments of the invention, each basic block has one entry point and one exit point.

In one or more embodiments of the invention, the model generator (105) is configured to create a set of graph nodes representing the identified basic blocks. Each graph node is created for a corresponding basic block. The CFG may include an entry node representing a starting node of the CFG and an exit node representing an ending node of the CFG. In one or more embodiments of the invention, the set of graph nodes includes one or more branch nodes which have two or more outgoing directed graph edges. Thus, a branch node is connected to two or more dependent nodes (i.e., destination nodes connected to by the outgoing edges).

In one or more embodiments of the invention, the model generator (105) is configured to create, based on the identified control structures, a set of directed graph edges connecting the graph nodes. Each directed graph edge represents an execution path between a source node and a destination node. Thus, in one or more embodiments of the invention, each node of the CFG is connected to at least one other node of the CFG by a directed graph edge.

In one or more embodiments of the invention, the model generator (105) is configured to extract, from each control structure, two or more Boolean edge predicates. The model generator (105) may extract the Boolean edge predicate from a basic block's branch condition, such that the predicate is true if and only if that branch edge is taken. For example, for the control structure "if (err !=0) { ... }", we will derive "err≠0" for the TRUE case, and "err=0" for the FALSE case. In one or more embodiments of the invention, the Boolean edge predicate is always representable as a base predicate.

In one or more embodiments of the invention, the model generator (105) is configured to assign each extracted edge predicate to a corresponding directed graph edge. The edge predicate may be evaluated based on one or more path-sensitive predicate expressions propagated through the CFG and/or one or more data items identified in the source code, in accordance with one or more embodiments of the invention.

In one or more embodiments of the invention, the static analysis tool (100) includes functionality to select a graph node of the CFG as a starting point for a backward traversal of the CFG. The program property definition may include one or more criteria for selecting the graph node. Examples of a criterion may include, but are not limited to, a statement type, a syntactical element of the programming language in which the source code is written, a search string, a program value, an operation, and/or any identifying element which may be used to identify a graph node as a starting point for traversal of the CFG. For example, in examining a CFG for a potential null pointer dereference defect, the static analysis tool (100) may select a graph node corresponding to a dereference operation as a starting point for the traversal. In this example, the program property definition's criteria indicates that the CFG should be traversed from the basic block containing the dereference operation.

In one or more embodiments of the invention, the static analysis tool (100) includes functionality to create a flow value at a selected graph node of the CFG. The flow value may be a Boolean flow value and/or a flow value selected from a set of possible values defined by the program property definition. A flow value is a path-sensitive value representing the state of one or more program objects, values, properties, elements, and/or attributes corresponding to a potential program property at a given location in the CFG. In one or more embodiments of the invention, the static analysis tool (100) uses the flow value to identify whether a program property exists within the source code. The static analysis tool (100) may compute flow values at one or more graph edges and/or nodes of the CFG in order to determine whether the program property exists.

In one or more embodiments of the invention, the static analysis tool (100) includes functionality to perform a backward traversal of the CFG beginning at the selected graph node. The backward traversal of the CFG may be performed according to any pre-defined method of traversing a CFG. In one or more embodiments of the invention, a breadth first traversal of the CFG is used in order to propagate flow values and/or representations of flow values to a target node of the CFG.

In one or more embodiments of the invention, the static analysis tool (100) is configured to select a current graph edge of the CFG for analysis. The current graph edge may be selected in accordance with the traversal method and may be connected to one or more traversed graph nodes and/or graph edges of the CFG. For example, if all directed graph edges below a given graph edge are traversed, the given graph edge may be selected. In this example, if a dependent graph edge (i.e., a graph edge below the current graph edge in a same branch of the CFG) of the current graph edge is not yet traversed, the dependent graph edge may be selected for analysis.

In one or more embodiments of the invention, the static analysis tool (100) is configured to determine whether the destination graph node of the current graph edge has more than one outgoing directed graph edges. An outgoing directed graph edge may be any directed graph edge connecting the current node as a source to another graph node. In one or more embodiments of the invention, if it is determined that the destination graph node has two or more outgoing directed graph edges, the static analysis tool (100) is configured to compute an edge predicate expression for each outgoing graph edge. The static analysis tool (100) may, for each outgoing graph edge, compute a conjoined predicate expression as a conjunction of (1) the predicate expression of the outgoing edge with (2) an edge predicate of the outgoing edge. In one or more embodiments of the invention, the static analysis tool (100) is configured to calculate a current predicate expression of the current graph edge as a disjunction of the conjoined expressions computed for each outgoing graph edge.

In one or more embodiments of the invention, the static analysis tool (100) may determine that the destination graph node of the current graph edge has only one outgoing directed graph edge. In this case, the static analysis tool (100) may simply propagate the predicate expression of the outgoing graph edge as the current predicate expression of the current graph edge.

In one or more embodiments of the invention, the static analysis tool (100) may determine that the destination graph node of the current graph edge is an exit point of the traversal. In this case, the static analysis tool (100) may propagate a flow value assigned to the exit point as the current predicate expression of the current graph edge.

In one or more embodiments of the invention, the static analysis tool (100) is configured to modify the current predicate expression prior to assigning the current predicate expression to the current graph edge. The current predicate expression may be modified based on one or more source code statements (i.e., statements) in the basic block of the destination graph node. Modifying the current predicate expression may include replacing the current predicate expression with a Boolean value or simplifying the predicate expression by replacing one or more program values with Boolean values. The static analysis tool (100) may perform the modification based on a criteria defined by a program property definition. For example, for a memory leak program property definition, the static analysis tool (100) may set the current predicate expression to FALSE upon encountering a memory deallocation statement in the basic block of the destination graph node. In this example, the program property definition criteria defines a criteria identifying the memory deallocation statement, and the static analysis tool (100) matches the criteria to the statement in the basic block. In one or more embodiments of the invention, if a statement matching the criteria is not made, no modification to the current predicate expression is made.

In one or more embodiments of the invention, the static analysis tool (100) includes functionality to determine whether the CFG is traversed. Traversal of the CFG may involve traversing only a subgraph (i.e., a portion) of the CFG if the starting node of the traversal is a non-exit graph node. Thus, if the traversal of the CFG began in a middle graph node (i.e., at a non-entry and non-exit node), then the CFG is deemed to be traversed upon traversing the subgraph of the CFG connecting the middle node and a target node (e.g., the entry graph node). In one or more embodiments of the invention, the CFG may be deemed to be traversed according to the method of traversal defined by a program property definition.

In one or more embodiments of the invention, the static analysis tool (100) includes functionality to compute a resulting predicate expression of a target node of the CFG. The resulting predicate expression may be the disjunction of two or more conjoined predicate expressions from the graph edges connected to the target node or it may be a propagated predicate expression of a single connected graph edge. In one or more embodiments of the invention, the static analysis tool (100) may assign the resulting predicate expression to the target node after modifying the resulting predicate expression based on one or more statements in the basic block. Thus, in one or more embodiments of the invention, the resulting predicate expression is a result of the backward traversal.

In one or more embodiments of the invention, the static analysis tool (100) constructs a single resulting predicate expression based on every other predicate expression generated during the backward traversal of the CFG and reduces, evaluates, and/or solves the resulting predicate expression during the traversal.

In one or more embodiments of the invention, the static analysis tool (100) includes functionality to identify a program property based on the resulting predicate expression of the target node. In one or more embodiments of the invention, the static analysis tool (100) may compare the resulting predicate expression to a Boolean flow value at a beginning point of the traversal in order to determine whether the program property exists. The comparison may be defined by a program property definition such that, if the resulting predicate expression and the Boolean flow value are equal, not equal, and/or any predefined combination of Boolean values, the program property is deemed to exist or not-exist. In one or more embodiments of the invention, if the resulting predicate expression is a non-Boolean value, the static analysis tool (100) may determine that a program property exists (based on the program property definition).

In one or more embodiments of the invention, the static analysis tool (100) is configured to record one or more annotations for one or more graph edges. The annotation may be recorded based on a flow value at a graph edge to indicate that the graph edge may be part of a path potentially depicting an occurrence of the program property. For example, given that a flow value of FALSE is interpreted as an indication that a potential program property exists, the static analysis tool (100) may record an annotation for each graph edge generating a FALSE flow value during traversal. In one or more embodiments of the invention, the static analysis tool (100) also records annotations for graph edges corresponding to a flow value of Unsolvable.

In one or more embodiments of the invention, the static analysis tool (100) is configured to identify, based on the resulting predicate expression, a path through the CFG depicting an occurrence of the program property (hereinafter "program property path"). For example, when analyzing source code for defects, the program property path may be an error path depicting an occurrence of the defect in the source code. The program property path may be identified based on a set of annotated graph edges. Any path from the entry point to the exit point of the graph consisting solely of annotated graph edges may be deemed to be a potential program property path. In one or more embodiments of the invention, only feasible paths are identified as potential program property paths.

In one or more embodiments of the invention, the static analysis tool (100) is configured such that, as a result of the backward traversal of the CFG and the computed flow values and predicate expressions, only feasible paths are identified.

In one or more embodiments of the invention, the static analysis tool (100) includes functionality to detect interprocedural program properties through the use of function summaries, which detail the externally visible behavior of the function. The static analysis tool (100) initially provides predefined function summaries for a first set of library functions of a given programming language (e.g., malloc and free in the C programming language). The static analysis tool (100) then propagates these function summaries bottom-up through the call graph using standard methods. In various embodiments of the invention, the generated function summaries may contain any portion of the following information, expressed in terms of function arguments, return values, constants, and globals:

Return values of the function
Stores into any pointer arguments
Stores into global variables
Allocations of memory that are visible to the caller
Deallocation of any pointer values
Escape of any pointer values (i.e., where a pointer is or may be stored into globally-accessible memory)
Control predicates that affect the operation of all of the above.

In one or more embodiments of the invention, the static analysis tool (100) includes functionality to perform an intraprocedural data flow analysis over each function that contains a potential bug. The intraprocedural data flow analysis may be performed after the function summaries are computed. At each function call-site encountered during the dataflow that may affect the bug, the static analysis tool (100) may update the dataflow predicates according to the function summary.

In one or more embodiments of the invention, the static analysis repository (110) is configured to store program property definitions, flow values, predicate expressions, predicate domains, and/or model data corresponding to the source code. The static analysis repository (110) may be implemented as a relational database, a hard disk drive, a networked array of storage devices, a software component (e.g., a data structure), a portion of a random access memory, and/or any physical or virtual storage device. Examples of model data may include one or more CFGs, graph nodes, graph edges, virtual memory models, program values, and/or any data necessary for modeling and/or checking of source code. In one or more embodiments of the invention, the static analysis repository (110) is configured to store one or more program property definitions and/or program property analyses related to a CFG.

In one or more embodiments of the invention, the static analysis tool (100) includes functionality to communicate with an integrated development environment (not shown) and/or various other components of the system through the management module (135) (or directly).

In one or more embodiments of the invention, the static analysis tool (100) is configured to obtain source code from a user. For example, the user may be a software tester, an engineer, an applications developer, an author of the source code, and/or a user of an integrated development environment. In one or more embodiments of the invention, the static analysis tool (100) includes a graphical user interface configured to obtain input from the user. Thus, the user may define/modify/select one or more program property definitions, source code, and/or initiate bug checking using the graphical user interface.

In one or more embodiments of the invention, the static analysis tool (100) includes functionality to initiate one or more periodic bug checking routines. In one or more embodiments of the invention, the static analysis tool (100) receives a definition of the timing and/or scope of the bug checking routine from the user. A bug checking routine may include one or more program property definitions to be used in the routine in accordance with one or more embodiments of the invention. In one or more embodiments of the invention, the static analysis tool (100) is configured to receive the one or more program property definitions and/or source code from the source code repository (125). For example, bug checking routines may be executed against at least a portion of a code base of a concurrent versioning system (CVS) stored in the source code repository, including multiple source code documents authored by one or more software developers.

In one or more embodiments of the invention, the source code repository (125) is configured to store source code. The source code repository (125) may be implemented as a software repository such as a relational database, a flat file, a folder, and/or any means of storing data on one or more hardware devices. The source code repository (125) may be an integrated part of a software application such as a CVS or an integrated development environment. Alternatively, the source code repository (125) may be implemented as a hard disk drive, a network storage device, and/or any type of memory device.

The memory (120) may be a Random Access Memory (RAM), a hardware cache, flash memory, and/or any other type of volatile or non-volatile storage medium. Further, the memory (120) may include functionality to store model data (i.e., graph nodes, graph edges, flow values, etc.) during generation and/or analysis of a CFG. In one or more embodiments of the invention, if the size of the CFG grows beyond a pre-defined threshold defined by a user or other entity, the model generator (105) is configured to cancel the modeling process and produce an error message. The pre-defined threshold may be defined by a user within a graphical user interface of the static analysis tool (100). A virtual memory space may be constructed by the model generator (105) within the memory (120) for the purpose of generating and/or verifying the CFG. In this way, virtual memory "values" corresponding to one or more model objects may be utilized (e.g., as program values) by the static analysis tool (100).

In one or more embodiments of the invention, the management module (135) provides interoperability, format conversion and/or cross-compatibility among the various components of the system (199), as illustrated in an exemplary form in FIG. 1. For example, the management module (135) may transfer data between the static analysis tool (100) and the source code repository (125), and/or vice-versa. Furthermore, the management module (135) may be used as a seamless integration point between any combination of components both within and outside of the system (199).

In one or more embodiments of the invention, various components of the system (199) are optional and/or may reside within other components or may be located on one or more physical devices.

Figure 2:
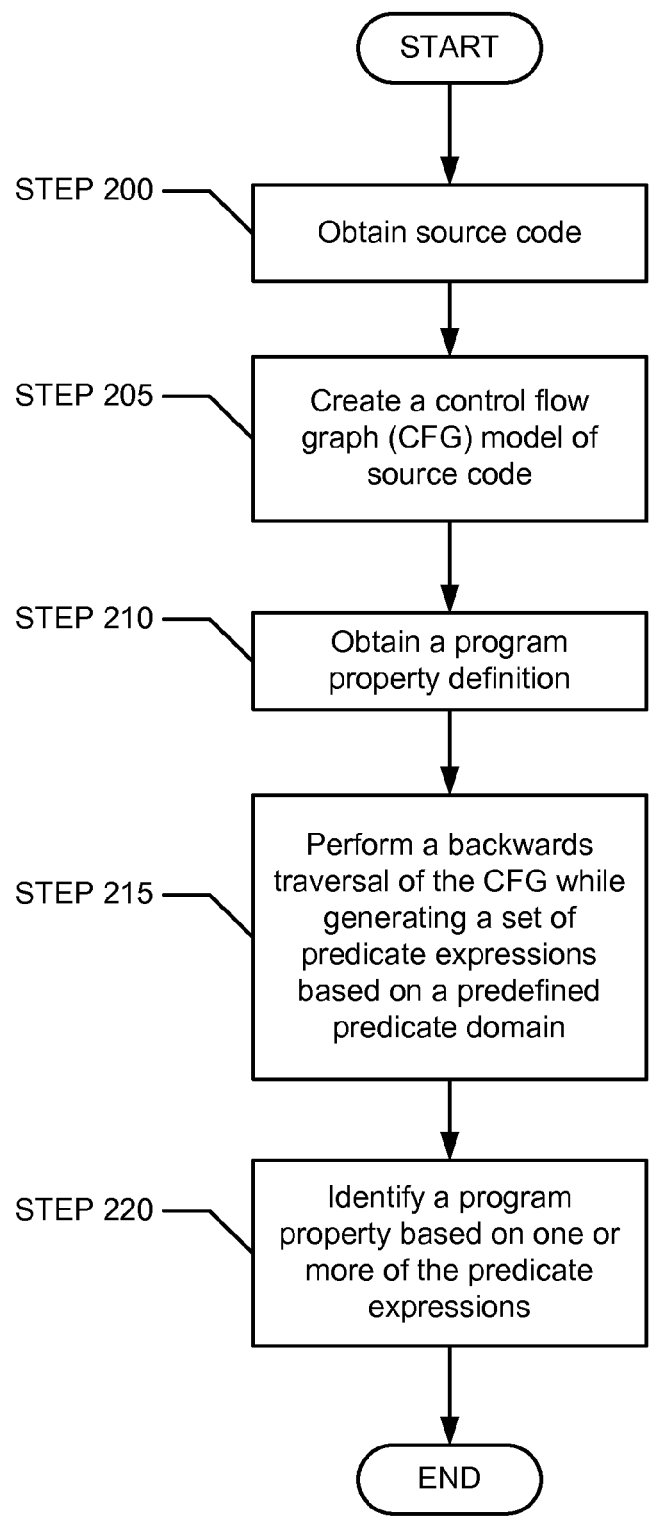
FIGS. 2-4 show flowcharts in accordance with one or more embodiments of the invention.

FIG. 2 shows a flowchart in accordance with one or more embodiments of the invention. The steps of the flowchart shown in FIG. 2 may be used to perform a static analysis on source code. The static analysis may generate a CFG and identify a program property related to the source code based on the CFG. While the various steps in the flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, source code is obtained. The source code may be obtained from a user, a software program (e.g., an integrated development environment), and/or any other entity. In one or more embodiments of the invention, the source code may be obtained in accordance with a periodic bug checking routine (e.g., a script performing one or more bug checking tasks), which obtains a pre-defined list of computer programs and/or portions of one or more computer programs.

Figure 3:
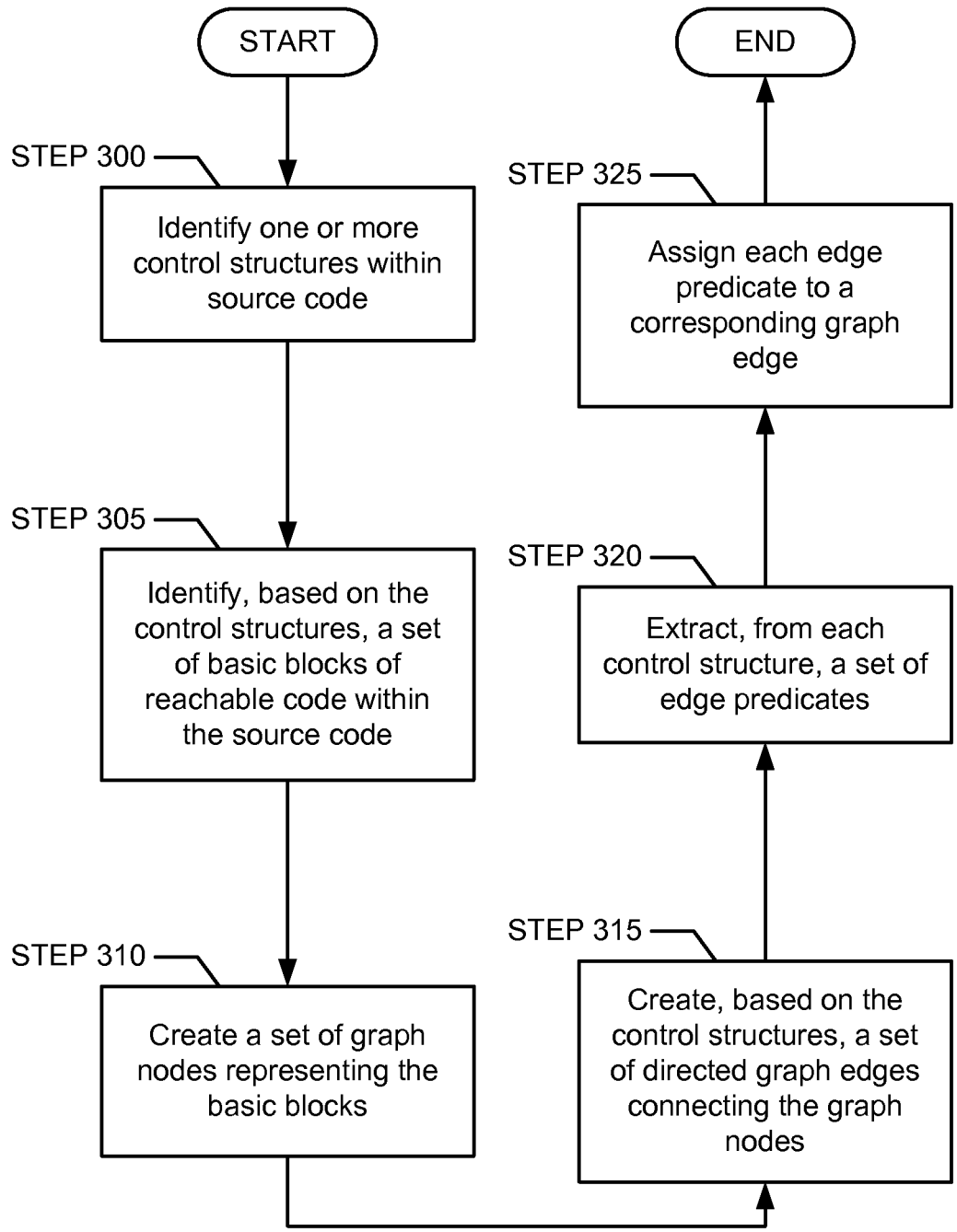

In STEP 205, a CFG model of the source code is created. The CFG includes a set of graph nodes representing basic blocks of the source code and a set of directed graph edges connecting the graph nodes. The CFG is a model of one or more potential execution paths of the source code. The flowchart depicted by FIG. 3 shows a method of constructing a CFG in accordance with one or more embodiments of the invention.

In STEP 210, a program property definition is obtained. The program property definition may include logic for identifying a program property based on the CFG. The program property definition may include a criteria for selecting a node of the CFG as a starting point for backward traversal of the CFG. In one or more embodiments of the invention, the program property definition also includes criteria for identifying one or more statements in a basic block of the CFG. The program property definition may assign a specified flow value to a predicate expression, during a traversal of the CFG, based on identifying the statements. Thus, in one or more embodiments of the invention, the program property definition includes rules, values, and logic necessary for analysis of a CFG in order to identify a specified program property type.

In STEP 215, a backward traversal of the CFG is performed. In one or more embodiments of the invention, an initial flow value is created at a starting node of the traversal. During the traversal, a set of predicate expressions representing flow values at various graph edges throughout the traversal path are generated and propagated upwards through the CFG. A resulting predicate expression is then calculated at a target node (i.e., a node identified as a stopping point of the traversal based on the program property definition) of the CFG. The predicate expressions are generated based on a predefined predicate domain, in accordance with one or more embodiments of the invention.

In STEP 220, a program property is identified based on one or more of the predicate expressions. In one or more embodiments of the invention, a resulting predicate expression of a target graph node is evaluated in order to determine whether the program property exists. For example, a static analysis tool (e.g., static analysis tool (100) of FIG. 1, discussed above) may determine that the program property exists if the resulting predicate expression evaluates to TRUE.

FIG. 3 shows a flowchart in accordance with one or more embodiments of the invention. The steps of the flowchart shown in FIG. 3 may be used to create a CFG model of source code. While the various steps in the flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 3 should not be construed as limiting the scope of the invention.

In STEP 300, one or more control structures are identified within source code. The control structures may be identified by parsing the source code into tokens and then matching the tokens to one or more predefined control statements defined by the programming language in which the source code is written. Each control structure, when executed, results in a selection of a path among a set of two or more alternative paths.

In STEP 305, a set of basic blocks of reachable code within the source code are identified based on the control structures. In one or more embodiments of the invention, by identifying the control structures, it is possible to divide the source code into basic blocks by identifying sets of statements and/or instructions which are necessarily executed together (i.e., not separated by any control structures).

In STEP 310, a set of graph nodes representing the basic blocks are created. A graph node is a model object representing a basic block in the CFG. The set of graph nodes may include an entry graph node representing an entry point of the CFG and an exit graph node representing an exit point of the CFG. The set of graph nodes may also include one or more branch graph nodes, each having two or more outgoing directed graph edges. In one or more embodiments of the invention, the entry point of the traversal may be a non-entry node and the exit point of the traversal may be a non-exit node of the graph. Thus, according to the type of program property being identified, the traversal of the CFG may cover only a subset of the CFG.

In STEP 315, a set of directed graph edges connecting the graph nodes are created based on the identified control structures. Each directed graph edge connects a source graph node with a destination graph node according to a corresponding control structure.

In STEP 320, two or more edge predicates are extracted from each control structure. Each directed graph edge is assigned an edge predicate such that the predicate evaluates to true if and only if the edge would be executed during normal program execution. In this way, each edge predicate may define a condition for selecting an execution path among the alternate execution paths defined by the control structure. The edge predicates may be extracted from the control structure by parsing the control structure into tokens and identifying one or more program values. In one or more embodiments of the invention, the program values may be used to construct the base predicate and/or simplify an expression extracted from the control structure such that the base predicate is representable in base predicate form. In STEP 325, each extracted edge predicate is assigned to a corresponding directed graph edge.

In one or more embodiments of the invention, the CFG is created by a model generator (e.g., model generator (105) of FIG. 1, discussed above) during a single pass or analysis of the source code. Thus, various STEPS of FIG. 3 may be performed concurrently and/or may be performed iteratively as the source code is analyzed. In one or more embodiments of the invention, both the creation of the CFG and a path-sensitive analysis of the CFG are performed in a single pass of the source code. The flowchart depicted by FIG. 4 shows a method of performing a path-sensitive analysis of a CFG, in accordance with one or more embodiments of the invention.

Figure 4:
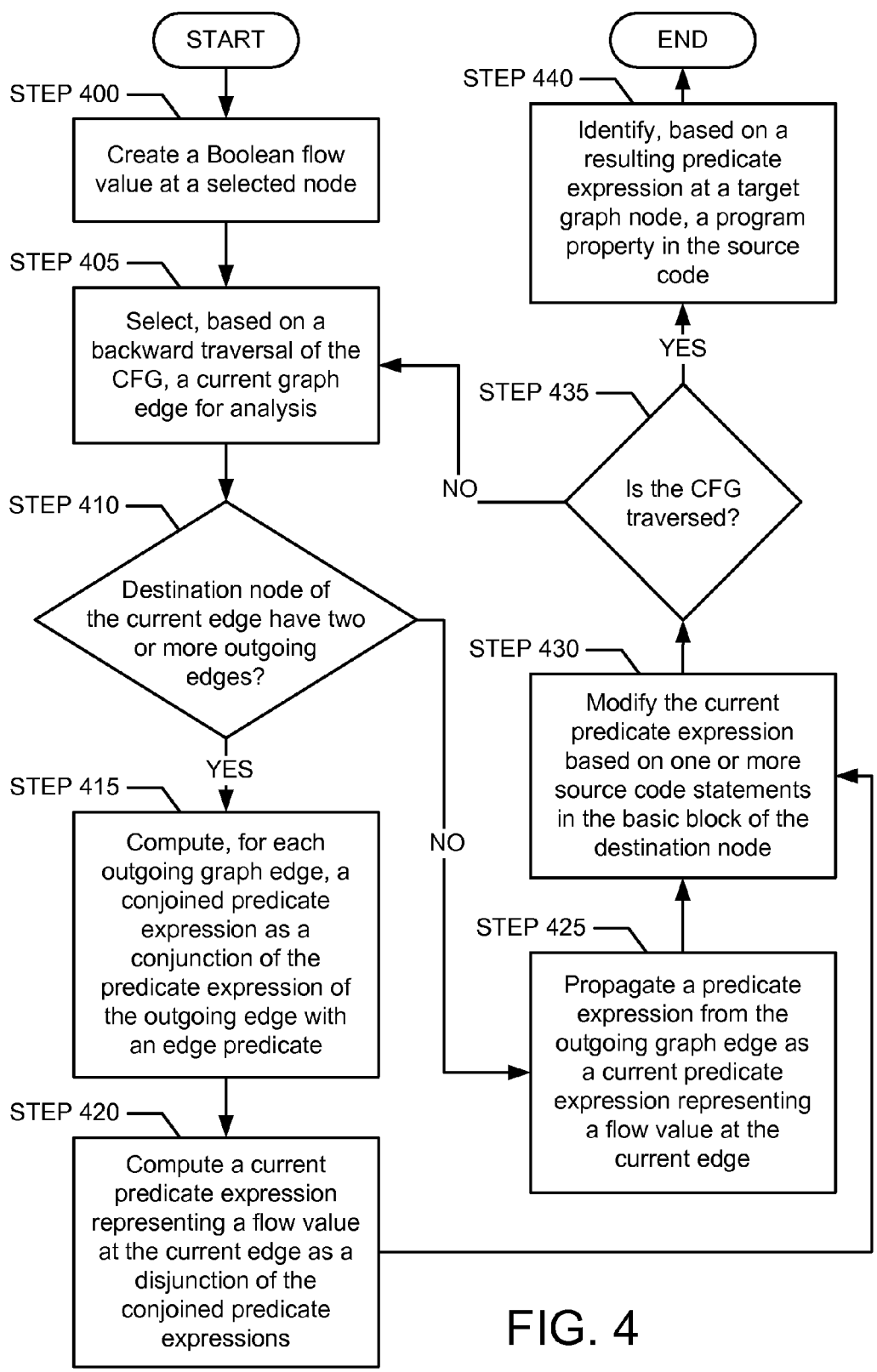

FIG. 4 shows a flowchart in accordance with one or more embodiments of the invention. The steps of the flowchart shown in FIG. 4 may be used to perform a backward traversal of a CFG. During the traversal, one or more predicate expressions representing flow values are generated and/or propagated through the CFG. A program property related to the source code may be identified based on a flow value at a target node of the CFG. While the various steps in the flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 4 should not be construed as limiting the scope of the invention.

In STEP 400, a Boolean flow value is created at a selected node of the CFG. The Boolean flow value may be obtained from a program property definition and may represent the state of a potential program property at a beginning of a traversal through the CFG. For example, for analysis of potential memory leaks, a FALSE Boolean flow value may be created at an exit node of the CFG. In this example, according to the program property definition, a FALSE value of any flow value in the CFG indicates that, at that point in the analysis, existence of the program property has not been ruled out. In one or more embodiments of the invention, the Boolean flow value at the selected node is considered the first predicate expression among a set of predicate expressions which represent flow values throughout the CFG.

In STEP 405, a current graph edge is selected for analysis based on a backward traversal of the CFG. In one or more embodiments of the invention, the traversal method defined by the program property definition requires selection of a graph edge for analysis which is connected to a traversed (i.e., visited) node. A traversed node is any node for which all outgoing graph edges are also traversed. In one or more embodiments of the invention, a graph edge is said to be traversed if a predicate expression corresponding to the graph edge is calculated. Generation of the predicate expression may refer to simply propagating the predicate expression from a dependent graph edge. For example, if the process has only visited an exit graph node of the CFG at this stage (e.g., in STEP 400), the next selected graph edge may be any edge connected to the exit node (according to the traversal method).

In STEP 410, it is determined whether a destination graph node of the current graph edge has two or more outgoing directed graph edges. In one or more embodiments of the invention, the traversal method requires that the outgoing directed graph edges be traversed. If it is determined that the destination graph node has two or more outgoing directed graph edges, the process proceeds to STEP 415. Conversely, if it is determined that the destination graph node has only one outgoing directed graph edge, the process proceeds to STEP 425.

In STEP 415, a conjoined predicate expression is computed, for each outgoing graph edge, as a conjunction of the predicate expression of the outgoing edge with an edge predicate of the outgoing edge. If the destination graph node of the current graph edge is a starting node of the traversal, the predicate expression may be a flow value assigned to the starting node. In one or more embodiments of the invention, the predicate expression, as with any predicate expression calculated during the analysis, may be simplified at each relevant STEP using one or more logical deduction rules (e.g., the deduction rules shown in Table 2, above).

In STEP 420, a current predicate expression representing a flow value at the current graph edge is computed as a disjunction of the conjoined predicate expressions. In one or more embodiments of the invention, the current predicate expression represents a path-sensitive flow value at the current graph edge.

In STEP 425, a predicate expression is propagated from the only outgoing graph edge as a current predicate expression representing a flow value at the current graph edge.

In STEP 430, the current predicate expression is modified based on one or more source code statements in the basic block of the destination node. Modifications may include simplifying the predicate expression based on one or more criteria defined by the program property definition or replacing the predicate expression entirely with a new expression and/or value. In one or more embodiments of the invention, the predicate expression depicts the state of the potential program property. Accordingly, the modification may indicate that the potential program property is verified to not exist at the current location in the CFG and/or any dependent locations. In one or more embodiments of the invention, in STEP 430 it may be determined that the basic block of the destination node does not contain any statements matching the criteria of the program property definition, in which case the flow value at the current graph node remains unchanged.

In one or more embodiments of the invention, STEP 430 occurs prior to the execution of STEPS 420 and 425. Thus, the current predicate expression may not be calculated until the modification of STEP 430 is completed on the propagated predicate expressions. In one or more embodiments of the invention, irrespective of the order of these STEPS, the current predicate expression does not represent the flow value at the current graph edge until the modification (if any) of STEP 430 is performed.

In one or more embodiments of the invention, all directed graph edges having the same destination graph node are assigned the same predicate expression. Thus, STEPS 410-430 may be performed only once for directed graph edges having the same destination graph node.

In STEP 435, it is determined whether the CFG is traversed. If it is determined that the CFG is not yet traversed, the process proceeds to STEP 405. If it is determined, based on the predefined traversal method, that the CFG is traversed, the process proceeds to STEP 440. In one or more embodiments of the invention, upon traversing a target graph node identified by the program property definition, the CFG is deemed to be traversed.

In STEP 440, a program property is identified in the source code based on a flow value at a target graph node of the CFG. In one or more embodiments of the invention, the program property is identified using a criteria of the program property definition, which may include instructions for interpreting the resulting flow value.

In a first example, a use-after-free program property definition is directed towards the detection of use-after-free bugs (i.e., cases where a pointer variable is dereferenced after the memory allocation has been freed). In this example, the static analysis tool begins by creating a Boolean flow value at a selected graph node of a CFG model of source code. The Boolean flow value is initialized to TRUE to indicate that a possible use-after-free bug is not yet detected, and subsequent flow values are set to FALSE upon encountering a use of a possibly deallocated pointer during a backward traversal of the CFG. If a predicate expression other than TRUE is backward propagated to a deallocation statement of the possibly-freed value, the static analysis tool reports a use-after-free bug.

In a second example, a path reachability program property definition is directed towards determining whether there exists a feasible path in a CFG model of source code from a designated source node, to a sink node (i.e., whether it is possible for the program to execute the source node's basic block, and then subsequently execute the sink node's basic block). The source node is a non-entry node of the CFG and the sink node is a non-exit node of the CFG.

In this example, a static analysis tool performs two data flow passes. For the first pass, the static analysis tool initializes a Boolean flow-value at the exit node of the CFG to TRUE (in this case to indicate that there is no path between the source and sink nodes), and assigns a value of FALSE to any subsequent flow value when the sink node is reached in the backward traversal. The static analysis tool computes a first resulting predicate expression at the source node as a path predicate. If the path predicate after data flow propagation is TRUE, then there is no feasible path between the two nodes. Conversely, if the predicate is FALSE, then we know that every path from the source node must reach the sink node.

Continuing the example, if the predicate has any other value, then the reachability may be dependent on branch conditions prior to the source node. To check for this possibility, the static analysis tool performs a second data flow pass, this time setting the flow-value to the previously determined path predicate at the source node, and ignoring the sink node. The static analysis tool again performs the backward traversal from the source node to the entry node and extracts a second resulting predicate expression at the entry node. If the disjunction of this predicate and the previous path predicate is TRUE, then again there is no feasible path between the source and sink; otherwise, a path may exist.

Figure 5A:
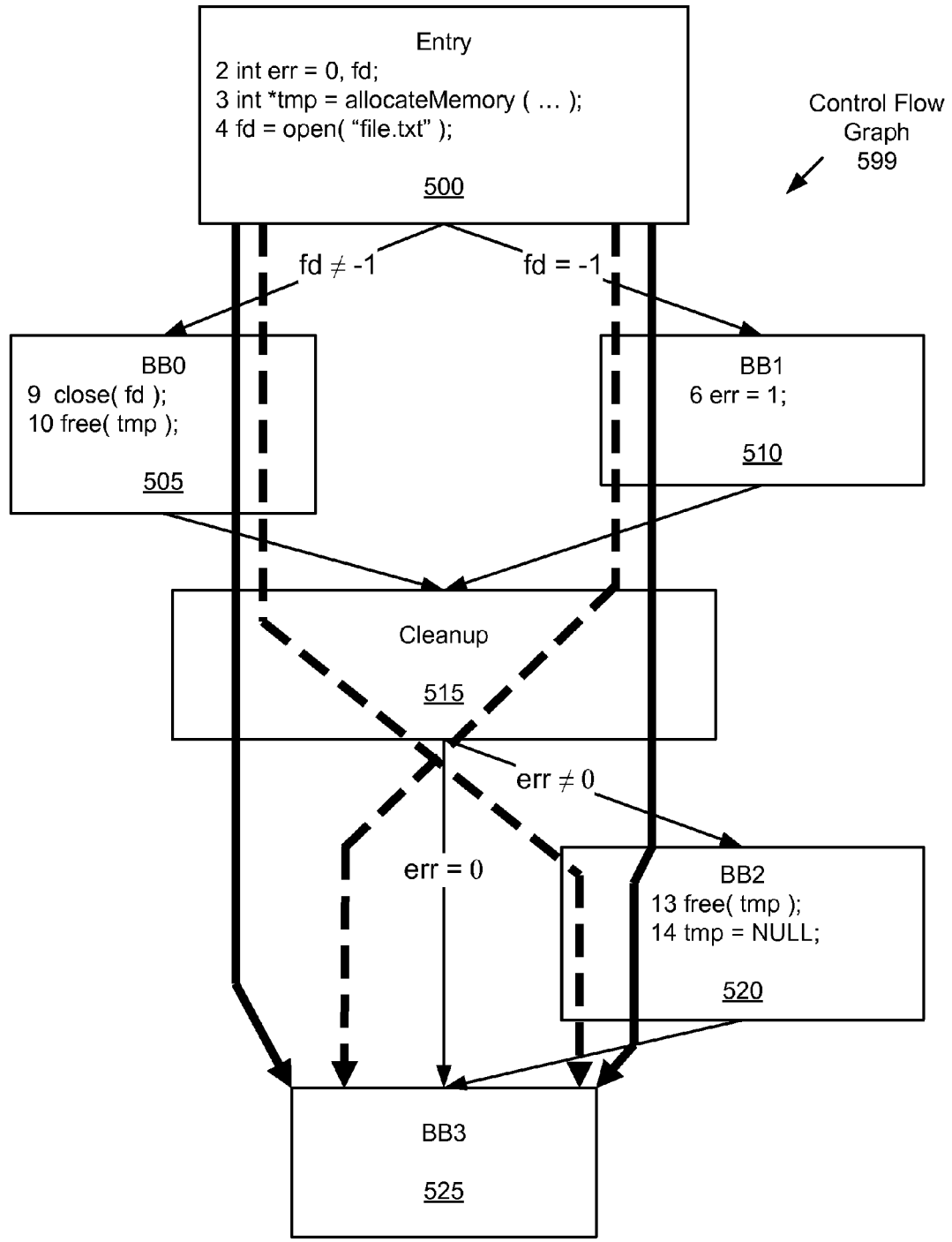
FIGS. 5A and 5B show example control flow graphs in accordance with one embodiment of the invention.

FIG. 5A depicts an example CFG (599) constructed from the pseudocode representation of source code shown in Table 3.

TABLE 3

Figure 5B:
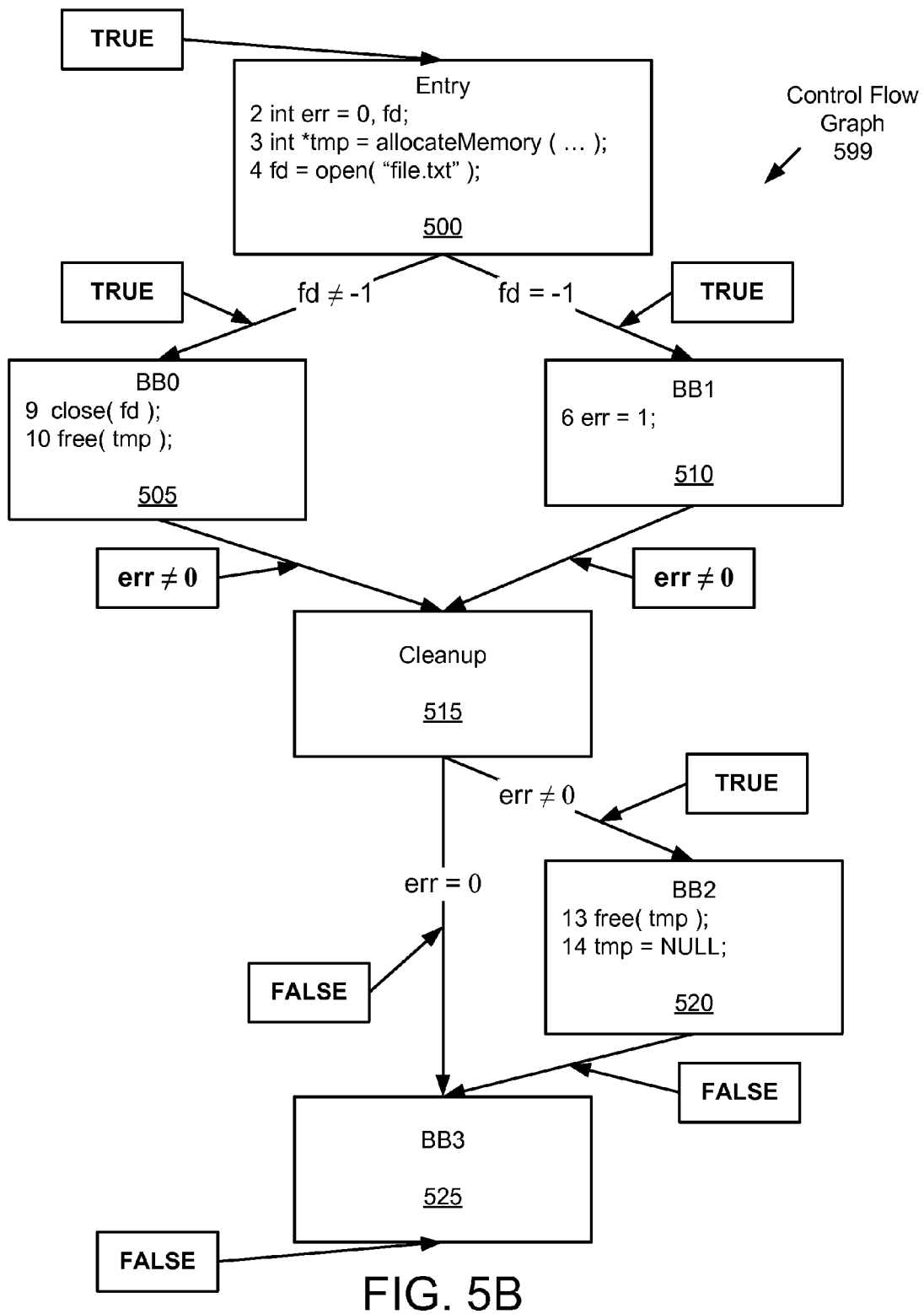

Sample pseudocode corresponding to FIGS. 5A and 5B

```
1   void example ( ) {
2       int err = 0, fd;
3       int *tmp = allocateMemory ( ... );
4       fd = open( "file.txt" );
5       if ( fd equals −1 ) {
6           err = 1;
7           goto cleanup;
8       }
9       close( fd );
10      free( tmp );
11  cleanup:
12      if( err not equal to 0 ) {
13          free( tmp );
14          tmp = NULL;
15      }
16  }
```

In a third example, a static analysis tool (e.g., static analysis tool (100) of FIG. 1, discussed above) obtains source code represented by the pseudocode in Table 3 (above). In this example, the static analysis tool is a bug checker that is executed by a command line interface.

Continuing the example, the static analysis tool proceeds to identify basic blocks of the source code and to generate the CFG (599) depicted by FIG. 5A based on the basic blocks. As shown in FIG. 5A, the static analysis tool creates a set of graph nodes representing the basic blocks (graph nodes 500, 505, 510, 515, 520, and 525). The graph nodes are connected by graph edges depicting potential execution paths of the source code. Based on the CFG (599) alone, it is not possible to determine which paths are feasible and which are infeasible. For purposes of illustration, the feasible paths of the CFG (599) are depicted in FIG. 5A as solid lines while the infeasible paths are depicted as dashed lines. The two feasible paths, in execution order of the graph nodes in FIG. 5A are: 500→505→515→525 and 500→510→515→520→525. The infeasible paths shown in FIG. 5A are: 500→505→515→520→525 and 500→510→515→525.

Continuing the example, the static analysis tool identifies the exit graph node (525) of the CFG (599) as a starting node of a backward traversal. The exit graph node is identified based on a memory leak program property definition. Also based on the program property definition, as shown in FIG. 5B, the static analysis tool assigns a Boolean flow value of FALSE to the exit graph node (525).

Continuing the example, the static analysis tool begins the backward traversal of the CFG (599) by visiting the graph edge connecting graph nodes 525 and 515. As depicted in FIG. 5B, the static analysis tool simply propagates the value FALSE from the exit node to both of these edges. The static analysis tool then selects the graph edge connecting graph nodes 520 and 515 for analysis as the current graph edge. First, the static analysis tool propagates the FALSE predicate expression value from the lower graph edge (i.e., the edge connecting graph nodes 525 and 520). Prior to assigning the same value to the current graph edge, the static analysis tool identifies a memory deallocation statement (i.e., "free( . . . )") in the basic block of graph node 520. This statement is present on line 13 of the example pseudocode of Table 3 (above). Thus, the current predicate expression is modified, based on the program property definition, to TRUE and assigned to the current graph edge.

Continuing the example, the static analysis tool then selects the graph edge connecting graph nodes 515 and 505 for analysis. The destination node of this graph edge is identified as node 515 and the outgoing graph edges of the destination node (515) are the graph edges connecting node 515 to nodes 525 and 520. The first outgoing graph edge (515→525) of the destination node (515) is analyzed, and a conjoined predicate expression is calculated as a conjunction of the predicate expression for the first outgoing graph edge ("FALSE") and the edge predicate "err=0". The conjoined predicate expression is computed to be "FALSE $\wedge$ (err=0)". A conjoined predicate expression for the second outgoing graph edge (515→520) of the destination graph node (515) is similarly calculated as "TRUE $\wedge$ (err≠0)". The current predicate expression of the current graph edge (505→515) is then calculated as the disjunction of the conjoined predicate expressions: "[FALSE $\wedge$ (err=0)] $\vee$ [TRUE $\wedge$ (err≠0)]". The static analysis tool simplifies this predicate expression to "err≠0" based on a set of deductive rules for disjoint predicate expressions (e.g., see Table 2, above). This current predicate expression is also propagated to every graph edge having the same destination graph node (515) as the current graph edge (505→515). Thus, graph edge 510→515 is also assigned the predicate expression "err≠0" as shown in FIG. 5B.

Continuing the example, the static analysis tool selects graph edge 500→505 as the current graph edge for analysis. The only outgoing graph edge of the destination node for this current graph edge (500→505) is graph edge 505→515. The static analysis tool also identifies, based on the program property criteria, a "free" statement on line 10 of the basic block of the destination node (505). The static analysis tool modifies the current predicate expression to "TRUE" as a result of identifying the statement. The "free" statement indicates that memory has been deallocated and, thus, the potential for memory leak does not exist (for the specified allocation of memory). Next, the static analysis tool selects graph edge 500→510 as the current graph edge for analysis (based on the traversal method). The predicate expression of graph edge 510→515 is propagated upward and is then modified based on the source code statement on line 6 of the source code (in the basic block of the destination node (510)). The source code statement of line 6 is an assignment "err=1" and thus guarantees the propagated predicate expression "err≠0" to equal TRUE. Again, the source code statement is identified and the modification is performed based on criteria defined by the program property definition.

Continuing the example, the two "TRUE" predicate expressions of graph edges 500→505 and 500→510 are disjoined as "TRUE $\vee$ TRUE" and a resulting predicate expression is calculated as "TRUE". Note that, in the example, the static analysis tool only identified source code statements which required modification of predicate expression values for graph nodes 520, 505, and 510, although the check was performed during the traversal of each graph node (except the exit graph node (525)). The static analysis tool determines, based on the resulting predicate expression ("TRUE"), that a memory leak defect does not exist within the source code.

Figure 6:
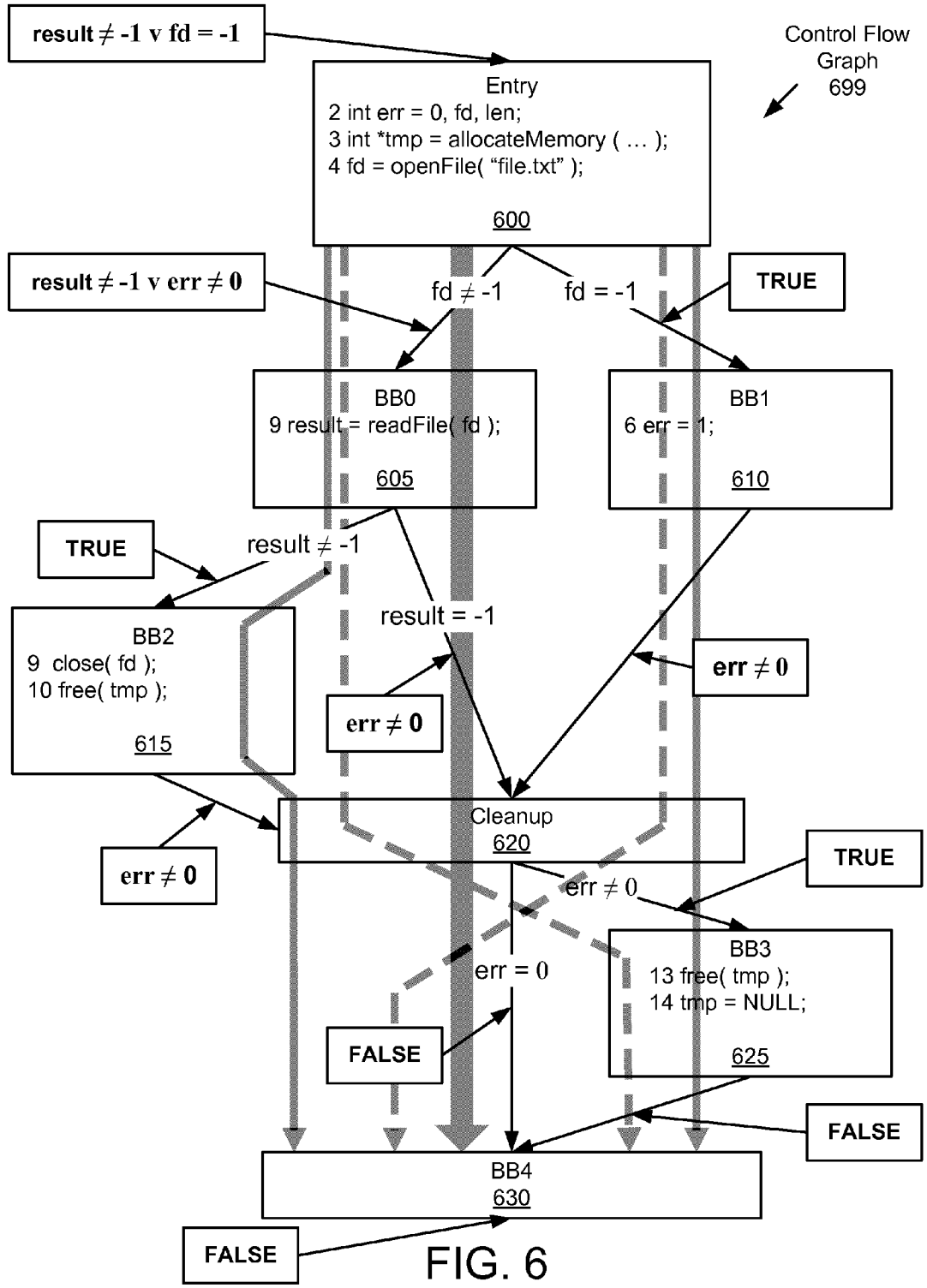
FIG. 6 shows an example control flow graph in accordance with one embodiment of the invention.

FIG. 6 depicts an example CFG (699) constructed from the pseudocode representation of source code shown in Table 4 (below).

TABLE 4

Sample pseudocode corresponding to FIG. 6

```
1   void example( ) {
2       int err = 0, fd, len;
3       int *tmp = allocateMemory ( ... );
4       fd = openFile( "file.txt" );
5       if( fd equals −1 ) {
6           err = 1;
7           goto cleanup;
```

TABLE 4-continued

Sample pseudocode corresponding to FIG. 6

```
 8          }
 9          result = readFile( fd );
10          if( result equals −1 ) {
11              goto cleanup;
12          }
13          close( fd );
14          free( tmp );
15      cleanup:
16          if( err not equal to 0 ) {
17              free( tmp );
18              tmp = NULL;
19          }
20      }
```

In a fourth example, a memory leak defect analysis is performed on the source code depicted by the sample pseudocode of Table 4 (above). FIG. 6 shows predicate expressions representing flow values at each directed graph edge of the CFG (699) as well as an initial Boolean flow value of "FALSE" at exit node 630 and a resulting predicate expression of "(result≠−1)∨ (fd=−1)" at entry node 600. In accordance with one or more embodiments of the invention, a backward traversal of the CFG (699) was performed in order to generate these predicate expressions. The feasible paths 600→605→615→620→630, 600→605→620→630, and 600→610→620→625→630 are identified by solid lines while the infeasible paths 600→605→620→625→630 and 600→610→620→630 are identified by dashed lines.

In this example, the static analysis tool determines, based on the resulting predicate expression not being equal to "TRUE", that the defect exists within the source code. In this example, a feasible program property path of the CFG (699) is identified as 600→605→620→630. The feasible program property path is shown in FIG. 6 as a heavy solid line. Due to the path sensitive generation of the resulting predicate expression and the other predicate expressions in the CFG (699), the identified program property path is guaranteed to be a feasible path. Furthermore, the program property path can be identified based solely on the resulting predicate expression by identifying graph edges which are annotated (during traversal) as potentially corresponding to a program property path. For example, by identifying annotations recorded against blocks 630, 620, 605, and 600, we see that 600→605→620→630 is the only feasible execution path. In this example, the static analysis tool constructed the CFG (699) and computed the predicate expressions in a single pass over the source code.

Figure 7:
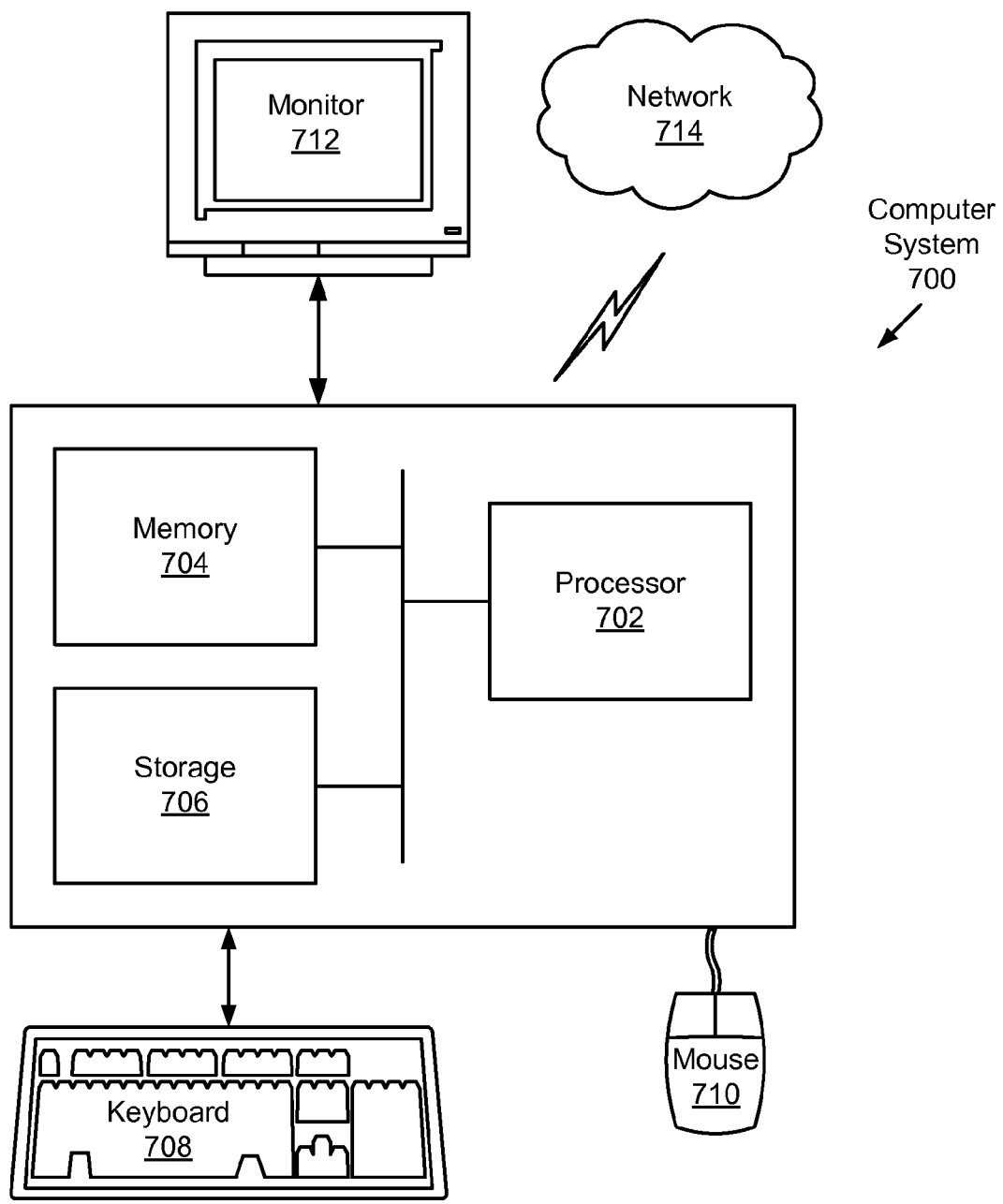
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) (such as a central processing unit (CPU), integrated circuit, hardware processor, etc.), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g., static analysis tool (100 of FIG. 1), model generator (105 of FIG. 1), static analysis repository (120 of FIG. 1), source code repository (125 of FIG. 1), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By utilizing a predefined predicate domain to generate one or more predicate expressions, the maximum size of the predicate expressions may be linear in the size of the CFG, and the predicate expressions may be amenable to solving via the use of substitution, logic, and integer arithmetic, without requiring an external theorem prover or constraint solver. This may lead to increased scalability of an analysis algorithm, in accordance with one or more embodiments of the invention.

Furthermore, source code may be represented in static single assignment (SSA) form. Source code having an intermediate representation in SSA form, when utilized in conjunction with one or more of the systems and/or methods disclosed herein, may improve the performance and/or precision of the aforementioned systems or methods.

Furthermore, while utilizing a predefined predicate domain may reduce the theoretical power of the analysis algorithm, in certain applications the predicate domain does not significantly impact the precision of the framework, as the predicate domain may be defined in a manner consistent with the way in which programmers typically manage control flow within programs. That is, in certain applications, the program may contain one or more flag variables which are set to different constant values according to the operations performed by the program, such that appropriate cleanup (i.e., release of resources) can be performed at the end of the program. By focusing on representing the flag variables, an analysis algorithm may spend reduced time considering values or predicates that are incidental to this purpose, in accordance with one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for static analysis to identify a potential program property, comprising:
    obtaining a plurality of source code;
    constructing a control flow graph (CFG) corresponding to the plurality of source code, by:
        identifying a plurality of control structures within the plurality of source code;
        identifying, based on the plurality of control structures, a plurality of basic blocks of reachable code within the plurality of source code;
        creating a plurality of graph nodes of the CFG representing the plurality of basic blocks, wherein the plurality of graph nodes comprises a first graph node and a second graph node; and
        creating, based on the plurality of control structures, a plurality of directed graph edges of the CFG connecting the plurality of graph nodes,
        wherein the plurality of directed graph edges comprises a first directed graph edge outgoing from the second graph node and a second directed graph edge outgoing from the second graph node, and
        wherein the plurality of directed graph edges further comprises a third directed graph edge outgoing from the first graph node to the second graph node;
    extracting, from at least one of the plurality of control structures, a first edge predicate for the first directed graph edge and a second edge predicate for the second directed graph edge, wherein the first edge predicate evaluates to TRUE if the first directed graph edge is taken, and wherein the second edge predicate evaluates to TRUE if the second directed graph edge is taken;
    assigning a first Boolean flow value corresponding to the potential program property to a selected node of the plurality of graph nodes;
    backward traversing the CFG from the selected node to a target node of the CFG;
    computing, by a computer processor and while backward traversing the CFG, a plurality of disjoint predicate expressions representing flow values corresponding to the potential program property at the plurality of directed graph edges,
        wherein the plurality of disjoint predicate expressions comprises a first disjoint predicate expression for the first directed graph edge, a second disjoint predicate expression for the second directed graph edge, and a third disjoint predicate expression for the third directed graph edge,
        wherein the third disjoint predicate expression is computed by:
            computing a first conjunction of the first disjoint predicate expression and the first edge predicate;
            computing a second conjunction of the second disjoint predicate expression and the second edge predicate; and
            computing a disjunction of the first conjunction and the second conjunction,
            wherein the third disjoint predicate expression is the disjunction of the first conjunction and the second conjunction;
    computing, by the computer processor and based on the plurality of disjoint predicate expressions, a resulting disjoint predicate expression representing a resulting flow value at the target node; and
    identifying, based on the resulting disjoint predicate expression, the potential program property in the source code, wherein identification of the potential program property indicates that source code corresponding to the traversed portion of the CFG can be subjected to at least one selected from a group consisting of redundant code reduction and an optimization technique.

2. The method of claim 1, wherein computing the plurality of disjoint predicate expressions comprises:
    identifying a disjoint predicate expression of the plurality of disjoint predicate expressions comprising a conjunction between distinct program values;
    designating the disjoint predicate expression as unsolvable; and
    propagating, as a result of designating the disjoint predicate expression as unsolvable, a value representing the disjoint predicate expression as unsolvable for a second Boolean flow value at a corresponding directed graph edge of the plurality of directed graph edges.

3. The method of claim 1, wherein computing the plurality of disjoint predicate expressions comprises:
    identifying a disjoint predicate expression of the plurality of disjoint predicate expressions comprising an irreducible disjunction of a pair of base predicates for a single program value;
    designating the disjoint predicate expression as unsolvable; and
    propagating, as a result of designating the disjoint predicate expression as unsolvable, a value representing the disjoint predicate expression as unsolvable for a second Boolean flow value at a corresponding directed graph edge of the plurality of directed graph edges.

4. The method of claim 1, further comprising:
    identifying, based on a potential program property definition, a source code statement within a basic block of the plurality of basic blocks;
    assigning, as result of identifying the source code statement, a second Boolean flow value to an incoming directed graph edge of the plurality of directed graph edges, wherein the second Boolean flow value is a complement of the first Boolean flow value; and
    identifying, based on the flow value at the target node of the CFG, a feasible error path of the CFG from the target node to the selected node.

5. The method of claim 1, wherein the potential program property is one selected from a group consisting of a memory leak defect, a use-after-free defect, and an unreachable path defect.

6. The method of claim 1, further comprising:
    creating, based on a function, a function summary comprising a return value of the function and a plurality of modifications of function arguments; and
    identifying a function call of the function within the plurality of source code, wherein computing the plurality of disjoint predicate expressions comprises evaluating the summary function.

7. A system for static analysis to identify a potential program property, comprising:
    a processor and a memory;
    a model generator residing in the memory, executing on the processor, and comprising functionality to construct a control flow graph (CFG) corresponding to a plurality of source code, by:
        identifying a plurality of control structures within the plurality of source code;
        identifying, based on the plurality of control structures, a plurality of basic blocks of reachable code within the plurality of source code;

creating a plurality of graph nodes of the CFG representing the plurality of basic blocks, wherein the plurality of graph nodes comprises a first graph node and a second graph node; and creating, based on the plurality of control structures, a plurality of directed graph edges of the CFG connecting the plurality of graph nodes, wherein the plurality of directed graph edges comprises a first directed graph edge outgoing from the second graph node and a second directed graph edge outgoing from the second graph node, and wherein the plurality of directed graph edges further comprises a third directed graph edge outgoing from the first graph node to the second graph node; and a static analysis tool residing in the memory, executing on the processor, and comprising functionality to:

obtain the plurality of source code;

extract, from at least one of the plurality of control structures, a first edge predicate for the first directed graph edge and a second edge predicate for the second directed graph edge, wherein the first edge predicate evaluates to TRUE if the first directed graph edge is taken, and wherein the second edge predicate evaluates to TRUE if the second directed graph edge is taken;

assign a first Boolean flow value corresponding to the potential program property to a selected node of the plurality of graph nodes;

backward traverse the CFG from the selected node to a target node of the CFG;

compute, while backward traversing the CFG, a plurality of disjoint predicate expressions representing flow values corresponding to the potential program property at the plurality of directed graph edges, wherein the plurality of disjoint predicate expressions comprises a first disjoint predicate expression for the first directed graph edge, a second disjoint predicate expression for the second directed graph edge, and a third disjoint predicate expression for the third directed graph edge, wherein the third disjoint predicate expression is computed by:

computing a first conjunction of the first disjoint predicate expression and the first edge predicate;

computing a second conjunction of the second disjoint predicate expression and the second edge predicate; and computing a disjunction of the first conjunction and the second conjunction, wherein the third disjoint predicate expression is the disjunction of the first conjunction and the second conjunction;

compute, based on the plurality of disjoint predicate expressions, a resulting disjoint predicate expression representing a resulting flow value at the target node; and identify, based on the resulting disjoint predicate expression, the potential program property in the source code, wherein identification of the potential program property indicates that source code corresponding to the traversed portion of the CFG can be subjected to at least one selected from a group consisting of redundant code reduction and an optimization technique.

8. The system of claim 7, further comprising:
a static analysis repository comprising:
a potential program property definition, wherein creating the first Boolean flow value at the selected node and identifying the potential program property are based on the potential program property definition.

9. The system of claim 8, wherein the static analysis tool further comprises functionality to:

identify, based on a potential program property definition, a source code statement within a basic block of the plurality of basic blocks;

assign, as result of identifying the source code statement, a second Boolean flow value to an incoming directed graph edge of the plurality of directed graph edges, wherein the second Boolean flow value is a complement of the first Boolean flow value; and identify, based on the flow value at the target node of the CFG, a feasible error path of the CFG from the target node to the selected node.

10. The system of claim 7, wherein computing the plurality of disjoint predicate expressions comprises:

identifying a disjoint predicate expression of the plurality of disjoint predicate expressions comprising an irreducible disjunction of a pair of base predicates for a single program value;

designating the disjoint predicate expression as unsolvable; and propagating, as a result of designating the disjoint predicate expression as unsolvable, a value representing the disjoint predicate expression as unsolvable for a second Boolean flow value at a corresponding directed graph edge of the plurality of directed graph edges.

11. The system of claim 7, wherein the static analysis tool further comprises functionality to:

create, based on a function, a function summary comprising a return value of the function and a plurality of modifications of function arguments; and identify a function call of the function within the plurality of source code, wherein backward propagating the plurality of disjoint predicate expressions comprises evaluating the summary function.

12. A non-transitory computer-readable storage medium storing a plurality of instructions for static analysis to identify a potential program property, the plurality of instructions comprising functionality to:

obtain a plurality of source code;

construct a control flow graph (CFG) corresponding to the plurality of source code, by:

identifying a plurality of control structures within the plurality of source code;

identifying, based on the plurality of control structures, a plurality of basic blocks of reachable code within the plurality of source code;

creating a plurality of graph nodes of the CFG representing the plurality of basic blocks, wherein the plurality of graph nodes comprises a first graph node and a second graph node; and creating, based on the plurality of control structures, a plurality of directed graph edges of the CFG connecting the plurality of graph nodes, wherein the plurality of directed graph edges comprises a first directed graph edge outgoing from the second graph node and a second directed graph edge outgoing from the second graph node, and wherein the plurality of directed graph edges further comprises a third directed graph edge outgoing from the first graph node to the second graph node;

extracting, from at least one of the plurality of control structures, a first edge predicate for the first directed graph edge and a second edge predicate for the second directed graph edge, wherein the first edge predicate evaluates to TRUE if the first directed graph edge is taken, and wherein the second edge predicate evaluates to TRUE if the second directed graph edge is taken;

assign a first Boolean flow value corresponding to the potential program property to a selected node of the plurality of graph nodes;

backward traverse the CFG from the selected node to a target node of the CFG;

compute, while backward traversing the CFG, a plurality of disjoint predicate expressions representing flow values corresponding to the potential program property at the plurality of directed graph edges, wherein the plurality of disjoint predicate expressions comprises a first disjoint predicate expression for the first directed graph edge, a second disjoint predicate expression for the second directed graph edge, and a third disjoint predicate expression for the third directed graph edge, wherein the third disjoint predicate expression is computed by:
  computing a first conjunction of the first disjoint predicate expression and the first edge predicate;
  computing a second conjunction of the second disjoint predicate expression and the second edge predicate; and
  computing a disjunction of the first conjunction and the second conjunction,
  wherein the third disjoint predicate expression is the disjunction of the first conjunction and the second conjunction;

compute, based on the plurality of disjoint predicate expressions, a resulting disjoint predicate expression representing a resulting flow value at the target node; and identify, based on the resulting disjoint predicate expression, the potential program property in the source code, wherein identification of the potential program property indicates that source code corresponding to the traversed portion of the CFG can be subjected to at least one selected from a group consisting of redundant code reduction and an optimization technique.

13. The non-transitory computer-readable storage medium of claim 12, wherein computing the plurality of disjoint predicate expressions comprises:
  identifying a disjoint predicate expression of the plurality of disjoint predicate expressions comprising an irreducible disjunction of a pair of base predicates for a single program value;
  designating the disjoint predicate expression as unsolvable; and
  propagating, as a result of designating the disjoint predicate expression as unsolvable, a value representing the disjoint predicate expression as unsolvable for a second Boolean flow value at a corresponding directed graph edge of the plurality of directed graph edges.

14. The non-transitory computer-readable storage medium of claim 12, wherein the plurality of instructions further comprise functionality to:
  identify, based on a potential program property definition, a source code statement within a basic block of the plurality of basic blocks;
  assign, as result of identifying the source code statement, a second Boolean flow value to an incoming directed graph edge of the plurality of directed graph edges, wherein the second Boolean flow value is a complement of the first Boolean flow value; and
  identify, based on the flow value at the target node of the CFG, a feasible error path of the CFG from the target node to the selected node.

* * * * *